Nov. 29, 1949    W. W. HANSEN    2,489,288
RADIATING ELECTROMAGNETIC WAVE
GUIDE AND RESONATOR

Filed July 10, 1940    3 Sheets-Sheet 1

INVENTOR.
WILLIAM W. HANSEN
BY Herbert H. Thompson
his ATTORNEY.

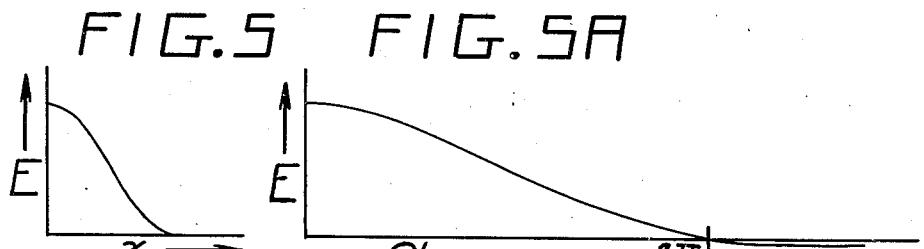
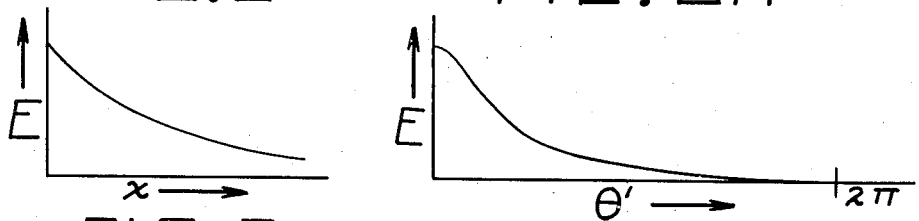
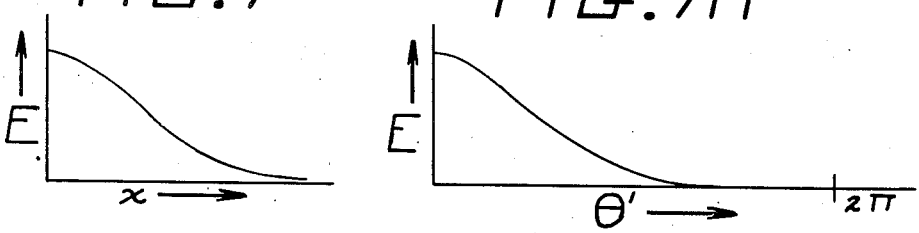
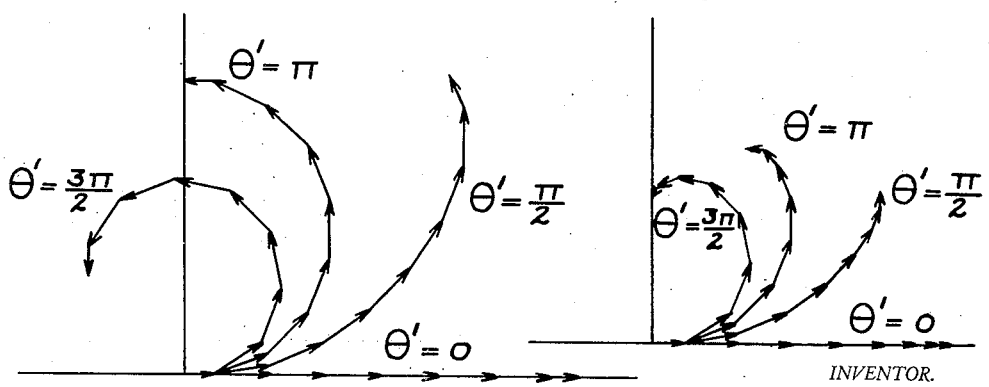
INVENTOR.
WILLIAM W. HANSEN

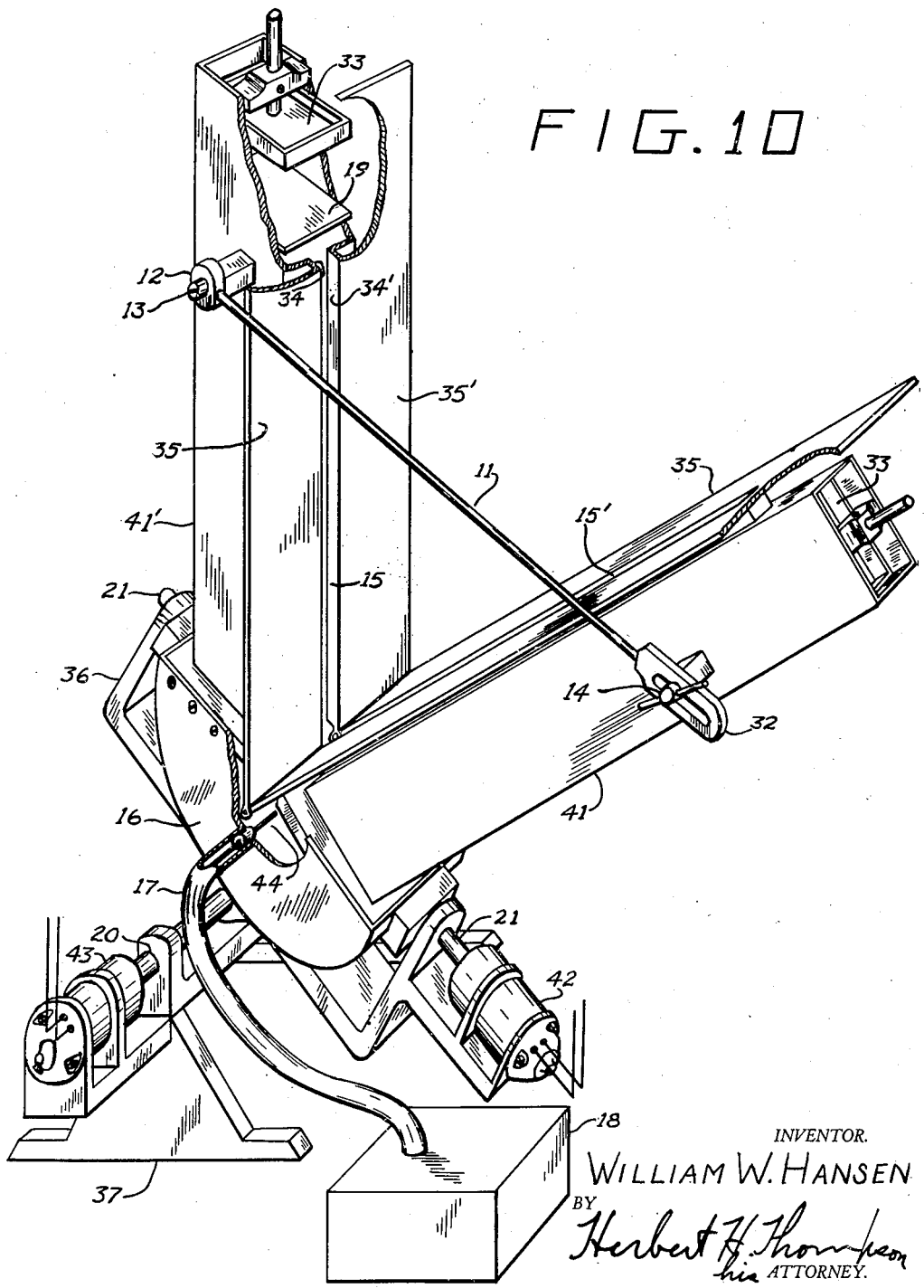

Patented Nov. 29, 1949

2,489,288

UNITED STATES PATENT OFFICE 2,489,288

RADIATING ELECTROMAGNETIC WAVE GUIDE AND RESONATOR

William W. Hansen, Stanford University, Calif., assignor to The Board of Trustees of The Leland Stanford Junior University, Stanford University, Calif., a corporation of California Application July 10, 1940, Serial No. 344,633

30 Claims. (Cl. 250—33.63)

This invention relates, generally, to the projection of radio waves in the form of a beam, or the selective reception of radio waves from a selected direction only, and the invention has reference more particularly to the use of suitably apertured and arranged conducting wave guides for the accomplishment of the results above mentioned.

The principle object of this invention is to produce simple, compact and easily portable apparatus for projecting directional radio beams, said beams being suitable, among other things, for guiding aircraft to safe landings under conditions of low or zero visibility.

Another object of the invention is to produce suitable radiating and receiving apparatus for the location of airplanes and ships, as for fire control purposes.

Another object of the present invention is to provide means for obtaining directive beams of electromagnetic energy of various desired configurations, such as fan-shaped beams, or conical beams.

Another object of the present invention is to provide novel apparatus employing conducting tubes suitable for guiding electromagnetic waves, such tubes being perforated or apertured to allow the escape of radiation therefrom, or otherwise equipped with means distributed throughout their length to withdraw some of the electromagnetic energy guided within the tubes and radiate such energy into space, to increase the signal strength in a preferred direction, the invention also comprising a method for predetermining the change in signal strength with change in direction from such preferred direction.

Another object of the present invention is to provide hollow resonators having suitable radiating means or apertures disposed to produce a desired shape of beam radiation, such as fan or conical beams.

Still another object of the present invention is to provide means for orientating said electromagnetic wave radiation apparatus in azimuth and elevation, as for effecting scanning operation and selective reception of radiation emitted or reflected from some remote object.

Other objects and advantages will become apparent from the specification, taken in connection with the accompanying drawings illustrating embodiments of the invention.

Figs. 3, 3A, 4, 4A, 5, 5A, 6, 6A, 7 and 7A inclusive are graphs illustrating a method for predetermining the change of signal strength resulting from a variation in direction from a preferred direction.

Figs. 8 and 9 illustrate a graphical method for obtaining the change of signal strength with a variation in direction from a preferred direction.

Fig. 10 is a perspective view of an embodiment of the invention with some parts broken away, producing a fan shaped beam and which is capable of being orientated for directing the projected beam of radiation in any desired angles of azimuth and elevation.

Figure 1:
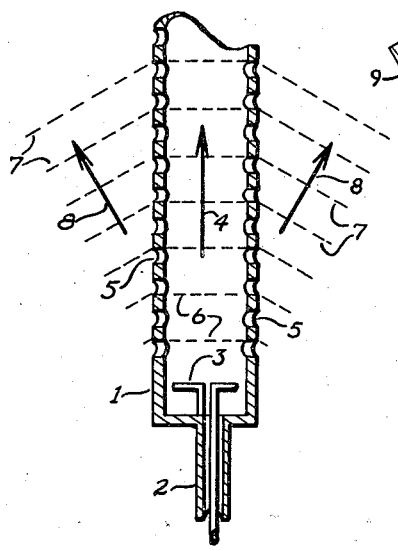
Fig. 1 is a longitudinal section of a portion of a wave guide including a representation of the wave crests within the guide, and of the radiation field outside the guide, and illustrates the principles of one form of the invention.

Referring now to Fig. 1 illustrating certain principles of the invention, I is a portion of cylindrical wave guide, 2 is a concentric transmission line exciting a doublet antenna 3, which launches electromagnetic radiation down the wave guide in the direction of an arrow 4. Perforations 5 in the walls of the wave guide allow electromagnetic energy to radiate into the space surrounding the wave guide. The dotted lines 6 represent at a particular instant the crests of waves travelling in the direction of arrow 4 within guide I, while the dotted lines 7 represent at the same instant the crests of waves travelling in the direction of arrows 8 in the space surrounding the guide. At a large distance from guide I, the wave system radiated into space will have substantially rotational symmetry about the axis of the guide, i. e., will have substantially conical wave fronts.

Within wave guide I, the distance between crests 6 is $\frac{1}{2}\lambda_1$, where $\lambda_1$ is the wave length of the electromagnetic radiation travelling in the direction of arrow 4 within the guide. Outside guide I, the distance between crests 7 is $\frac{1}{2}\lambda_0$, where $\lambda_0$ is the wave length in free space of the electromagnetic radiation which has been emitted through apertures 5. As the wave length of the radiation within the guide is longer than that in free space, as is well known to those skilled in the art, the direction of the radiation in free space, as indicated by arrows 8, must diverge from the direction within the wave guide which is along the axis of the guide. Representing the acute angles between arrows 4 and 8 by $\theta_0$, then by elementary geometry, $$\cos \theta_0 = \frac{\lambda_0}{\lambda_1}$$

As is well known, the phase velocity of an electromagnetic wave for a given frequency is proportional to its wave length. Also the phase velocity and wave length of free radiation in air are substantially equal to those of light in free space. Accordingly, the following relation also holds:

$$\cos \theta_0 = \frac{v_0}{v_1}$$

where $v_0$ is the phase velocity of the wave or of light in free space and $v_1$ is the wave phase velocity within the guide.

It is desirable to have several perforations 5 within a distance $\lambda_1$ along guide 1, and these perforations may in some instances be replaced by a longitudinal slot, as illustrated in Fig. 10.

Figure 2:
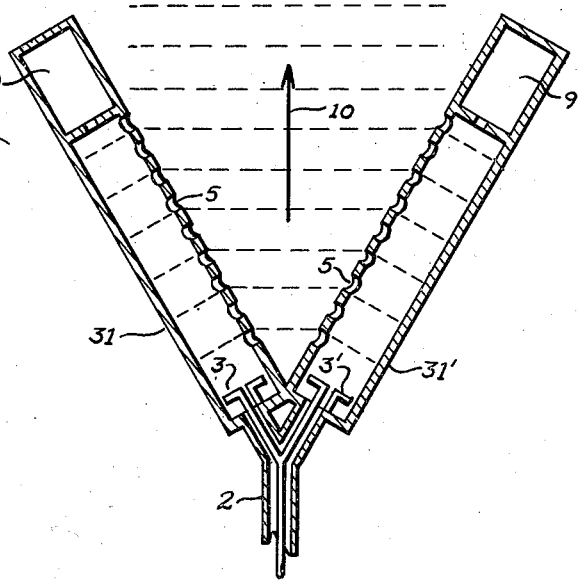
Fig. 2 is a longitudinal section of a radiation guide comprising two wave guides connected so as to produce a fan-shaped beam of radiation.

Referring now to Fig. 2 illustrating a structure the invention may assume, two wave guides 31, 31' are placed at an angle to each other to form a radiation guide producing a fan shaped beam of electromagnetic radiation. Electromagnetic energy is launched along the guides by means of antennae 3, 3'. The angle between guides 31 and 31' is made equal to twice $\theta_0$, and the guides are excited in the same phase so that the space radiation of the two guides will reinforce in the direction indicated by an arrow 10, along the bisectrix of the angle between guides 31 and 31'. The length of the guides is preferably made sufficiently long to correspond to a number of wave lengths of the radiated energy. By properly proportioning the guides and using a suitable size of apertures 5, substantially all the energy will be radiated through these apertures, and without any appreciable amount of energy reaching the outer ends of the guides, so that these guides may be left open. Under other conditions, a small amount of electromagnetic energy may reach the ends of the guides and be partially reflected back along the guides if the ends should be left open. The reflected energy will be radiated in the opposite direction, or backward along the arrow 10. This backward radiation may be so small as to cause no harm, or may be unimportant for other reasons. When substantially no backward radiation is desired, then guides 31, 31' may be terminated in a known manner as indicated at 9 to absorb the electromagnetic energy reaching the ends of the guides. While the apertures 5 in guides 31, 31' are shown as facing each other in the plane of the figure, this is not necessary to secure the benefits of the invention.

It is desirable to prevent rotation of the plane of polarization of the electromagnetic waves launched within guides 31, 31' by antennae 3, 3'. This can readily be accomplished in the case of a cylindrical guide by means of a longitudinal fin extending radially inwardly toward the axis of the guide. It is also known that conducting guides of the type described herein behave as high-pass filters, so that for a given size of guide no radiation of wave length greater than a limiting wave length can be transmitted. The invention contemplates eliminating electromagnetic waves of undesired polarization by using a rectangular guide and by reducing one of the dimensions of the guide cross-section so that electromagnetic waves of the wave length launched along the guide cannot be transmitted along the guide when of undesired polarization.

In Fig. 2 the radiation from guides 31 and 31' will reinforce along the direction of arrow 10. In any direction in the plane of the figure making a slight angle with arrow 10, waves from the various apertures of guides 31, 31' will no longer arrive in the same phase and will cancel each other more or less depending upon the angle such direction makes with the direction of arrow 10. According to the present invention, the change in signal strength for a slight variation in direction from the direction of maximum signal, indicated by arrow 10, can be made very great, and can be predetermined at will. The variation of signal strength for variations in direction from that of arrow 10 in a plane at right angles to that of the figure is more gradual than is the case for the plane of the figure, so that the radiated beam is of fan shape, being narrow in the plane of the figure and wide in the plane at right angles to that of the figure. Such a fan-shaped beam of radiation is desirable for certain purposes. In directions outside the fan shaped beam cancellation is practically complete.

In the plane of the fan, the directivity of the radiation guide can be increased by placing a number of radiators similar to Fig. 2 side by side, the gain in directivity being similar to that obtained by a broadside array of radiating antennae. An equal increase in directivity can also be obtained with a smaller number of radiators of rectangular cross-section where each radiator has a plurality of parallel slots of the type illustrated in Fig. 10.

According to the invention, the directivity at right angles to the plane of the fan, i. e., in the plane of Fig. 2, can be predetermined by varying the rate at which electromagnetic energy leaks out of guides 31, 31' as a function of the distance along the guide measured from antennae 3, 3'. At a large distance from the radiation guide, the electromagnetic field of the radiated energy, which will be called $E(\theta)$, can be considered as built up of the vector sum of the fields of the various waves coming from the several portions of the radiator. The waves from various portions of the radiator will start with different phases and will travel different distances in order to arrive at the same time at the point in space where it is desired to obtain the field strength $E(\theta)$. By superposition, the combined effect of all these waves is such that, approximately, $E(\theta)$ is proportional to $$\int \epsilon(x) e^{ikx\theta \sin \theta_0} dx \qquad (1)$$

where $x$ is the distance measured along the wave guide, $\epsilon(x)$ is the electric field just outside the guide at the point $x$, $k$ equals $$\frac{2\pi}{\text{(wave length)}}$$

$\theta$ is the angle between the direction of strongest transmission and the direction in which the field $E(\theta)$ is desired, $i$ equals $$\sqrt{-1}$$

$e$ is the base of natural logarithms, and $\theta_0$ is the angle between the wave guide and the direction of best transmission.

Expression (1) assumes that the cross-section of the guide has been so chosen with relation to the wave length radiated that the ratio of the velocity of phase propagation within the guide to the velocity in free space is such as to radiate with highest intensity in the desired direction, and also makes certain approximations which are strictly valid only when the length of the guide is more than a few wave lengths, which can readily be realized in practice.

Expression (1) is of the type occurring in the theory of Fourier transforms, and in fact $E(\theta)$ is essentially the Fourier transform of $\epsilon(x)$. A well known property of Fourier transforms is that they can readily be inverted, so that $$\int E(\theta) e^{-iks \sin \theta} d\theta \qquad (2)$$

Extensive tables of Fourier transforms are available and these can be immediately applied to determine the relation between the energy leakage along the guide and the field strength variation with departure from the optimum direction.

Figure 3:
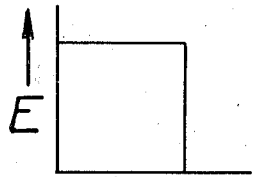
Figure 3A:
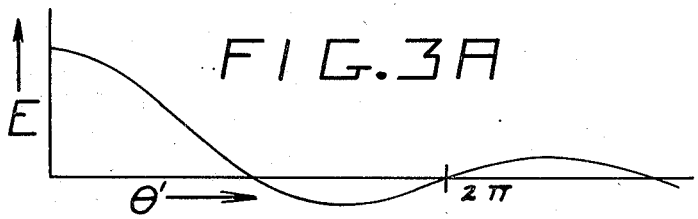

In Fig. 3, the electric field $\epsilon(x)$ immediately outside the guide is shown as constant along the guide, and Fig. 3a gives the field strength $E(\theta')$ at a distance from the radiation guide as a function of $\theta'$, which here is proportional to the angular deviation $\theta$ of the distant point in the plane of the radiation guide from the direction of best transmission. It will be noted that the radiation pattern in Fig. 3A indicates that ears or lobes of radiation of considerable magnitude exist in the pattern beyond the first zero of radiation which occurs at $\theta'$ equal to $\pi$, which may not be desirable.

Figure 4:
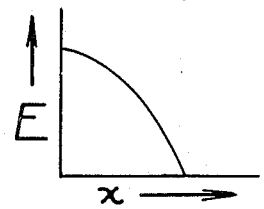
Figure 4A:
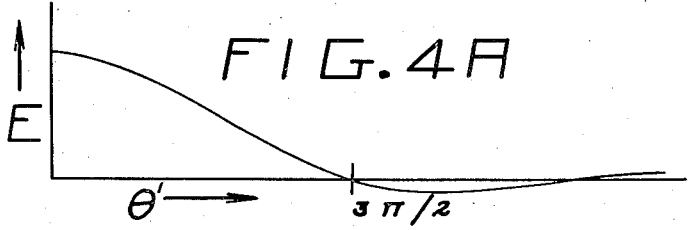

With a field immediately outside the guide as indicated in Fig. 4 where $\epsilon(x) = \cos x$, the first zero in Fig. 4a occurs at $\theta'$ equal to $3\pi/2$ and the ears or lobes of radiation beyond this zero are very much reduced compared to those present in Fig. 3A.

Fig. 5 indicates a field immediately outside the guide for which $\epsilon(x) = 1 + \cos x$. For such a field, Fig. 5A indicates that the first zero of radiation occurs at $\theta'$ equal to $2\pi$, and the ears of radiation present beyond this zero are still further reduced compared to those indicated in Fig. 4A.

Fig. 6 indicates a field at the guide for which $\epsilon(x) = e^{-x}$, and Fig. 6A shows that for this case $E(\theta')$ steadily decreases with increasing $\theta'$.

Fig. 7 indicates a field at the guide for which $\epsilon(x) = e^{-x^2}$, and Fig. 7A shows that $E(\theta')$ decreases with increasing $\theta'$. Figs. 6A and 7A show no reversal of $E(\theta')$.

Figures 3A to 7A inclusive have been obtained conveniently from the corresponding Figures 3 to 7 inclusive by making use of the theory of Fourier transforms. The same result can be obtained graphically.

Fig. 8 illustrates the graphical determination of the field strength at a distance from the radiator for various values of $\theta'$, where $\theta'$ is proportional to the deviation from the direction of maximum field intensity, when $\epsilon(x)$ immediately outside the guide is constant, as in Fig. 3. In Fig. 8 the vectors are plotted so that their horizontal components represent the contributions to the field $E(\theta')$ of the various portions of the guide. For $\theta'$ equal to zero, which corresponds to the direction of maximum intensity, it will be seen that the vectors representing the contributions of the various portions of the wave guide all arrive in phase. For $\theta'$ equal to $\pi$, the various vectors combine so as to cancel each other, corresponding to the first zero of radiation of Fig. 3A.

Fig. 9 illustrates the graphical determination of the field strength at a distance from a radiator for which the field $\epsilon(x)$ outside the radiator is given by Fig. 4. It will be noted that in Fig. 9, the magnitude of the various vectors, representing contributions from various portions of the wave guide, decreases to correspond with the form of $\epsilon(x)$ given in Fig. 4.

When the desired field distribution $E(\theta)$ is given, it is also possible to determine the required distribution $\epsilon(x)$ of the field just outside the radiator. This can be done analytically, when convenient, or graphically. It is thus possible to greatly expedite the design of a radiation guide to give a predetermined radiation field.

The proportionality factor relating $\theta'$ in Figs. 3A, 4A, 5A, 6A, 7A, 8 and 9 to the actual angle $\theta$ may be ascertained from the physical dimensions of the radiator and the wave length radiated, or it may be obtained by measurements of radiation intensity for various angles for a specific radiator, as given in an example hereinafter.

Referring now to Fig. 10, illustrating a practical structure, 41 and 41' are rectangular wave guides cooperating to form a radiation guide or directional antenna structure as described in connection with Fig. 2. The desired angular adjustment of guides 41, 41' with respect to one another is shown maintained by means of a tie rod 11 terminating at one end in an eye 12 engaging a pin 13 fastened to guide 41', and terminating at the other end in a slotted member 32 engaging a winged bolt 14 secured to guide 41.

Guides 41, 41' have longitudinal radiation slots 15, 15' in the opposing walls thereof, and communicate at their lower ends with an interconnecting box 16. The electromagnetic energy is shown launched along the guides by means of a quarter wave antenna 44 projecting into box 16, the antenna being energized through a concentric line 17 from a high frequency transmitter indicated at 18. The interior cross-section of the rectangular guides 41, 41' is proportioned so that only waves of correct polarization can be launched along the guides, as previously explained in connection with Fig. 2. The excitation of guides 41, 41' in the same phase and to the same magnitude is readily obtained by placing guides 41, 41' symmetrically with respect to interconnecting box 16 and antenna 44.

Guides 41, 41' are each shown terminated by resistance plates 19 of a high resistance material, such as carbon, to dissipate any electromagnetic energy reaching the ends of the guides, the plates 19 having currents induced therein by the passage of the electromagnetic energy, which currents are dissipated as heat. Any electromagnetic energy flowing past plates 19 is reflected by adjustable conducting plates 33. By properly adjusting the spacing between plates 33 and 19 with respect to the wave length of the electromagnetic energy, the energy reflected by plates 33 will reach resistance plates 19 in the proper phase to be absorbed thereby, so that substantially all the electromagnetic energy reaching the ends of guides 41, 41' will be dissipated in resistance plates 19. In instances where guides 41, 41' are made sufficiently long so that substantially all the electromagnetic energy launched along the guides has been radiated into the surrounding space through the slots 15 before the ends of the guides are reached, the terminal impedance formed by plates 19 and 33 may be omitted.

The slots 15 are provided with conducting edges 34, 34'. Edges 34, 34' form capacities which enable electromagnetic energy to cross the slots by establishing electric fields across the slots. Some of the electromagnetic energy crossing the slots is radiated into space, and ground plates 35, 35' are placed at right angles to the slot edges to facilitate the launching of the energy emitted from the slots into the surrounding space. Ground plates 35, 35' are preferably made of a width larger than one wavelength. By introducing slot edges 34, 34' an additional design factor is obtained to control the rate of energy radiation through slots 15. For a given excitation of the guides 41, 41' and a given width of slot, increasing the width of edges 34, 34', within limits depending upon the wavelength, will decrease the electric field strength across the slots, and hence will decrease the rate of radiation from the slots. In this way the field distribution discussed with respect to Figs. 3-9 may be provided.

While the radiation guides in Figs. 2 and 10 have been shown formed of hollow conducting wave guides where each wave guide is shown to be straight and of constant cross-section, that is not essential to secure the benefits of the invention. It is known that the phase velocities of waves in such guides will be different for guides having different cross-sections. It is essential that for each portion of such a hollow wave guide of constant cross-section, the angle between the direction of such guide portion and the desired direction of maximum radiation intensity correspond to the angle $\theta_0$ derived in connection with Fig. 1. Hence, the wave guides must be so inclined to a direction of maximum radiation intensity that the projection of a small longitudinal portion of the guide upon such direction is to the length of such guide portion in the same ratio as the wave length in free space of the radiated energy is to the wave length of the electromagnetic energy within the guide portion.

The fan shaped beam of high frequency electromagnetic energy projected by the radiation guide of Fig. 10 can be oriented in the plane of the fan by rotation of the radiation guide about shaft 21 fastened to box 16 and rotatably mounted in yoke 36. A motor 42 provided with reduction gearing coupled to shaft 21 is shown for accomplishing this purpose. Orientation of the beam in the plane at right angles to that of the fan is obtained by rotation of the radiation guide about shaft 20 fastened to yoke 36, extending at a right angle to shaft 21, and rotatably mounted in base 37. A motor 43 is shown for driving shaft 20.

A radiation guide of the type shown in Fig. 10 was constructed having two wave guides, each guide having a cross-section of 2⅝ in. by 1¾ in., each of said guides being 72 in. long and forming an angle of 80 degrees with respect to each other, each wave guide having a radiation slot ¼ in. wide and ½ in. deep. It was found, in use, that when the radiation guide was supplied with electromagnetic energy having a wave length of approximately 8.6 centimeters, a radiation pattern was obtained at a distant point from the guide for which the field strength in the plane of the guide decreased to one-half of maximum field strength for a deviation of 1.41 degrees from the direction of maximum radiation intensity. Only a fractional part of the electromagnetic energy launched along the wave guides reached the ends of the guides, and these ends were left open. The electric field $\epsilon(x)$ outside the radiation slots substantially corresponded to the field shown in Fig. 6, and the proportionality factor for this radiator correlating the actual radiation field with the electric field $E(\theta')$ of Fig. 6A is determined by the value of $\theta'$ in Fig. 6A for which the field strength $E(\theta')$ is one-half of its maximum value, which in Fig. 6A obtains when $\theta'$ is equal to one.

The directivity achieved by a given radiation antenna structure in transmission is also obtainable for reception of electromagnetic radiations either emitted or reflected from a distant object, in which case a receiver will be used in connection with the apparatus instead of a transmitter.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Means for directing a beam of electromagnetic energy comprising, a plurality of hollow wave guides making angles with each other, means for launching traveling electromagnetic waves along said guides, and distributed means along the length of said guides in opposed faces thereof for extracting electromagnetic energy from said guides and radiating it into the space surrounding said guides.

2. Means for directionally radiating electromagnetic energy comprising, two hollow wave guides forming a predetermined angle with respect to each other, means for launching traveling electromagnetic waves in said guides so that the same are in specified phase relation at specified points in both guides, said guides having apertures distributed along the opposing faces only of said guides for radiating electromagnetic energy into space in a definite pattern.

3. Means for directionally radiating electromagnetic waves comprising a plurality of hollow wave guides disposed in desired angular relationship to each other, means for launching traveling waves along said guides, means located at corresponding points of said guides for absorbing electromagnetic energy, said guides having apertures distributed thereover in opposed faces thereof for radiating electromagnetic energy.

4. In apparatus of the character described, a hollow container, a plurality of co-planar hollow wave guides connecting with and extending outwardly from said container, means for launching electromagnetic waves within said container for traveling therefrom and along said guides, said guides having opposed faces provided with longitudinally extending radiation apertures, and means for adjusting the angular relationship of the same so that the radiations from said guides combine to form a common wave front extending substantially at right angles to the bisector of the angle between said guides.

5. In apparatus of the character described, a hollow container, a plurality of hollow wave guides connecting with and extending outwardly from said container, means for launching electromagnetic waves within said container for traveling therefrom and along said guides, and means for adjusting the angular relationship of said guides with respect to each other, said guides being provided with apertures in opposed faces thereof for radiating electromagnetic waves to produce a fan shaped zone of electromagnetic energy in space, the plane of said zone extending at right angles to the plane of said guides.

6. In apparatus of the character described for directionally radiating radio beams, a plurality of hollow wave guides having common ends in electrical communication with each other, said guides having radiating means distributed along their lengths in opposed faces thereof for radiating electromagnetic energy, said radiating means being of such nature that the energy radiated at different points along the guides is predetermined.

7. Means for directionally transmitting or receiving electromagnetic waves comprising, a plurality of hollow electromagnetic wave guides arranged so as to be inclined to a common axis, the inclination of said guides to the axis in any part of their lengths being such that the ratio of a small length of the guide to its projection on said axis is substantially equal to the ratio of the phase velocity of the waves in the guide to the phase velocity of light in free space, and distributed coupling means along said guides producing electromagnetic coupling between the inside and the outside of said guides.

8. Means for directionally transmitting or receiving electromagnetic waves comprising a plurality of hollow electromagnetic wave guides, means for launching traveling electromagnetic waves within said guides, said guides having at least one dimension transverse to their length large compared to a wave length in free space of the waves, said plurality of wave guides being inclined to a common axis so that the length of a projection of a small longitudinal portion of the guide on said axis is to the length of the section of the guide as the wave length of the waves projected by said projecting means in free space is to the wave length of the said waves in the guide, and coupling means between the interior and exterior of said guides distributed along the lengths of said guides, and transverse thereto over the widths of said guides.

9. Apparatus for the directional propagation or reception of electromagnetic waves comprising a hollow container of electromagnetic waves having a plurality of branches, means for launching electromagnetic waves in said branches, and means for radiating said waves into space distributed along said branches, said branches in any part of their length forming an angle with a common axis such that the ratio of a small length of said branch to its projection on said axis is substantially equal to the ratio of the phase velocity of the waves in said branch in said part of its length to their phase velocity in free space.

10. Means for radiating electromagnetic energy comprising a hollow conducting tube, means adjacent one end of said tube for launching traveling electromagnetic waves traversing the same, a reflector plate closing the other end of said tube and longitudinally adjustable therein, resistance means for absorbing electromagnetic energy positioned within said tube in advance of said reflector plate, said resistance means serving to dissipate energy approaching the end of said tube having said reflector plate therein, the adjustment of said reflector plate serving to effect the absorption of energy reflected therefrom by said resistance means, said tube being apertured longitudinally of its length for launching electromagnetic energy therefrom.

11. Directional radiating means for radiating high frequency electromagnetic waves comprising a hollow metallic electromagnetic wave guide, means for supplying electromagnetic energy to said guide, the phase velocity of the waves in the guide being greater than the phase velocity of light in free space, said guide having means for radiating electromagnetic waves at an angle thereto such that the cosine of said angle is equal to the ratio of the phase velocity of the waves outside the guide to the phase velocity of the waves inside the guide, said radiating means comprising a plurality of apertures distributed along said guide.

12. Means for radiating electromagnetic energy comprising a hollow conducting tube, means for launching electromagnetic waves therein, said tube having means for radiating electromagnetic waves at an angle thereto such that the cosine of said angle is the ratio of the phase velocity of the radiated waves to that of the phase velocity of the waves in said tube, said radiating means comprising a plurality of apertures distributed longitudinally along said tube for a distance that is long compared to the wavelength of said waves in said tube.

13. Directional electromagnetic wave antenna apparatus, comprising a plurality of hollow wave guides making angles with each other, means for coupling to electromagnetic waves travelling along said wave guides, and further coupling means distributed along the length of said guides in opposed faces thereof for producing electromagnetic coupling between the interior and exterior of said guides.

14. Directional electromagnetic wave antenna apparatus, comprising a plurality of hollow wave guides making angles with each other, said guides having longitudinally-extending slots in opposed faces thereof for producing electromagnetic coupling between the interior and exterior of said guides, and means for coupling to electromagnetic energy within said guides.

15. Electromagnetic wave antenna apparatus, comprising a plurality of hollow electromagnetic wave guides angularly disposed to a common axis, the inclination of at least a portion of the length of each of said guides to said axis being substantially equal to the angle whose cosine is the ratio of the wavelength in free space of waves of the operating frequency to the wavelength in said guides of said waves, and coupling means distributed along said guides for producing electromagnetic coupling between the interior and exterior of said guides.

16. Directional electromagnetic wave antenna means, comprising a hollow metallic electromagnetic wave guide having a phase velocity for waves therein at the operating frequency thereof greater than the phase velocity of light in free space, said guide having distributed coupling means therealong producing electromagnetic coupling between waves inside said guide and waves outside said guide having an angle thereto whose cosine is substantially equal to the ratio of the phase velocity of waves outside said guide to the phase velocity of said waves inside said guide, said distributed coupling means comprising means for exchanging energy between the interior and exterior of said guide distributed over a plurality of points along said guide.

17. Apparatus as in claim 16, wherein said points are spaced by a distance short in comparison to the wavelength of said waves within said guide.

18. Directional electromagnetic wave antenna means, comprising a hollow metallic electromagnetic wave guide having a phase velocity for waves therein at the operating frequency thereof greater than the phase velocity of light in free space, said guide having distributed coupling means therealong producing electromagnetic coupling between waves inside said guide and waves outside said guide having an angle thereto whose cosine is substantially equal to the ratio of the phase velocity of waves outside said guide to the phase velocity of the waves inside said guide, said distributed coupling means comprising a slotted aperture extending longitudinally along said guide for a distance long compared to the wavelength of said waves in said guide.

19. Directional electromagnetic antenna apparatus, comprising a hollow electromagnetic wave guide dimensioned to provide a phase velocity for electromagnetic waves of the operating frequency therein of a value greater than the phase velocity of light in free space, said wave guide including coupling means distributed therealong on opposite sides thereof for distances long in comparison to a wavelength of said operating frequency for producing electromagnetic coupling between the interior and exterior of said guide, whereby a conical directivity characteristic for said apparatus is produced.

20. Apparatus as in claim 19, wherein said coupling means comprises a plurality of apertures on opposite sides of said wave guide and spaced apart a distance small in comparison to the wavelength in said guide of said operating frequency.

21. Apparatus as in claim 19, wherein said coupling means comprises a pair of slots, in the exterior wall of said guides, one extending longitudinally on each side of said wave guide for a distance long in comparison to a wavelength in said guide of the operating frequency.

22. Electromagnetic wave apparatus comprising a pair of conducting wave guides dimensioned to provide a phase velocity for waves of operating frequency therein of a value greater than the phase velocity of light in free space, and disposed at an angle with respect to one another substantially equal to twice the angle whose cosine is the ratio of said free-space light phase velocity to said wave phase velocity, said wave guides being provided with electromagnetic coupling means for producing transfer of electromagnetic energy between the interior and exterior of said guides.

23. Electromagnetic wave antenna apparatus for producing a desired variation of radiation intensity with respect to an axis of maximum radiation, comprising apparatus as in claim 15 wherein said coupling means is arranged to provide a predetermined electric field at the exterior of said wave guides when said wave guides are excited by energy of the operating frequency, which electric field varies along said wave guides in accordance with the Fourier transform of said desired radiation intensity expressed as a function of angular deviation from said axis of maximum radiation.

24. Electromagnetic wave antenna apparatus comprising a rectangular conducting hollow wave guide having a slot extending longitudinally in one face thereof, a pair of parallel conducting members extending along said slot at the edges thereof and perpendicular to said face and providing depth to said slot, a further pair of conducting members connected to the edges of said first members and substantially perpendicular to said slot to provide wave launching ground plates, and means for coupling to electromagnetic energy within said guide.

25. Electromagnetic wave antenna apparatus comprising a hollow wave guide adapted to enclose travelling electromagnetic waves of predetermined frequency, said guide having a slot extending longitudinally in the wall thereof for a distance long in comparison to a wavelength of said predetermined frequency, whereby said guide will have a directivity characteristic with a maximum directivity in a direction at an angle to said guide having a cosine equal to the ratio of the phase velocity of light in free space to the phase velocity of waves in said guide.

26. Electromagnetic wave antenna apparatus for producing a desired variation of radiation intensity with respect to an axis of maximum radiation, comprising apparatus as in claim 15, wherein said coupling means is arranged to provide a predetermined electric field at the exterior of said wave guides when said wave guides are excited by energy of the operating frequency, which electric field varies cosinusoidally along said wave guides in accordance with the Fourier transform of said desired radiation intensity expressed as a function of angular deviation from said axis of maximum radiation.

27. Electromagnetic wave antenna apparatus for producing a desired variation of radiation intensity with respect to an axis of maximum radiation, comprising apparatus as in claim 15, wherein said coupling means is arranged to provide a predetermined electric field at the exterior of said wave guides when said wave guides are excited by energy of the operating frequency, which electric field varies exponentially along said wave guides in accordance with the Fourier transform of said desired radiation intensity expressed as a function of angular deviation from said axis of maximum radiation.

28. In combination, a radio antenna comprising a pair of intersecting, angularly related, uniconductor pipe guides, said guides having respective walls that face each other, the said facing walls each having a multiplicity of apertures spaced apart along the length of the respective guide, and means for exciting radio frequency electromagnetic waves in said pair of guides or receiving such waves therefrom.

29. In combination, a pair of conductive-walled electromagnetic wave guides, each having a wall with a multiplicity of apertures spaced apart therein along the length of the respective guide, and exciting or receiving means common to said guides for exciting electromagnetic waves in both of said guides for transmission out through said multiplicity of apertures or for receiving from said guides electromagnetic waves entering through said multiplicity of apertures, said guides being disposed, with reference to three mutually perpendicular planes, substantially in a first of said planes, substantially symmetrically on opposite sides of a second plane passing between them, and with the said apertures in each of said guides spaced at progressively greater distances from both said second plane and the third of said planes.

30. In a system for the transmission of ultra-high-frequency electric waves, a wave collimator comprising a pair of leaky pipe guides divergent from a common point, wave translating means coupled to both of said guides at said point, and wave guiding means connected laterally of both of said leaky guides in wave transfer relation therewith.

WILLIAM W. HANSEN.

REFERENCES CITED

The following references are of record in the file of this patent:

UNITED STATES PATENTS

| Number | Name | Date |
|---|---|---|
| 2,206,923 | Southworth | July 9, 1940 |
| 2,241,119 | Dallenbach | May 6, 1941 |

OTHER REFERENCES

Proceedings of the I. R. E., vol. 26, No. 12, Dec. 1938, pages 1512 and 1513.

Certificate of Correction

Patent No. 2,489,288 November 29, 1949

WILLIAM W. HANSEN

It is hereby certified that error appears in the printed specification of the above numbered patent requiring correction as follows:

Column 5, line 13, after the words "so that" insert $E(x)$ *is proportional to*; and that the said Letters Patent should be read with this correction therein that the same may conform to the record of the case in the Patent Office.

Signed and sealed this 23rd day of May, A. D. 1950.

[SEAL]

THOMAS F. MURPHY,
*Assistant Commissioner of Patents.*